US009021269B2

(12) United States Patent
Spilman (10) Patent No.: US 9,021,269 B2
(45) Date of Patent: Apr. 28, 2015

(54) BLIND HASHING

(71) Applicant: TapLink, Inc., San Jose, CA (US)

(72) Inventor: Jeremy Spilman, San Jose, CA (US)

(73) Assignee: TapLink, Inc., San Jose, CA (US)

( * ) Notice: Subject to any disclaimer, the term of this patent is extended or adjusted under 35 U.S.C. 154(b) by 49 days.

(21) Appl. No.: 13/944,743

(22) Filed: Jul. 17, 2013

(65) Prior Publication Data

US 2014/0032922 A1    Jan. 30, 2014

Related U.S. Application Data

(60) Provisional application No. 61/673,185, filed on Jul. 18, 2012, provisional application No. 61/729,145, filed on Nov. 21, 2012.

(51) Int. Cl.
*G06F 21/60* (2013.01)
*G06F 21/62* (2013.01)
*H04L 9/06* (2006.01)
*H04L 9/32* (2006.01)

(52) U.S. Cl.
CPC .......... *G06F 21/602* (2013.01); *G06F 21/6209* (2013.01); *H04L 9/0643* (2013.01); *H04L 9/3226* (2013.01); *H04L 9/3239* (2013.01)

(58) Field of Classification Search
CPC .... H04L 9/0643; H04L 9/3236; H04L 9/3239
USPC ................................................. 713/168, 184
See application file for complete search history.

(56) References Cited

U.S. PATENT DOCUMENTS

| 8,392,561 | B1* | 3/2013 | Dyer et al. ..................... 709/225 |
| 8,528,060 | B2 | 9/2013 | Di Crescenzo et al. |
| 2006/0265335 | A1* | 11/2006 | Hogan et al. .................... 705/65 |
| 2007/0061571 | A1* | 3/2007 | Hammes et al. ............... 713/168 |
| 2007/0150348 | A1* | 6/2007 | Hussain et al. ................. 705/14 |
| 2013/0212385 | A1* | 8/2013 | Schechter et al. ............ 713/168 |

OTHER PUBLICATIONS

Giovanni Di Crescenzo et al., Perfectly Secure Password Protocols in the Bounded Retrieval Model, 19 pages.
Danei Florencio et al., An Administrator's Guide to Internet Password Research, 18 pages.

* cited by examiner

*Primary Examiner* — Arvin Eskandarnia
(74) *Attorney, Agent, or Firm* — Anderson Gorecki & Rouille LLP (57) ABSTRACT

A blind hashing system and method are provided in which blind hashing is used for data encryption and secure data storage such as in password authentication, symmetric key encryption, revocable encryption keys, etc. The system and method include using a hash function output (digest) as an index or pointer into a huge block of random data, extracting a value from the indexed location within the random data block, using that value to salt the original password or message, and then hashing it to produce a second digest that is used to verify the password or message, encrypt or decrypt a document, and so on. A different hash function can be used at each stage in the process. The blind hashing algorithm typical runs on a dedicated server and only sees the digest and never sees the password, message, key, or the salt used to generate the digest.

23 Claims, 4 Drawing Sheets

BLIND HASHING

CROSS REFERENCE TO RELATED APPLICATIONS

This patent application claims priority from U.S. Provisional Patent Application Ser. No. 61/673,185, SECURE STORAGE OF PASSWORD HASHES, filed Jul. 18, 2012 and U.S. Provisional Patent Application Ser. No. 61/729,145, BLIND HASHING, filed Nov. 21, 2012, the entirety of each of which is incorporated herein by this reference thereto.

BACKGROUND OF THE INVENTION

1. Technical Field

This invention relates generally to the field of data encryption and secure data storage. More specifically, this invention relates to computer-implemented mechanisms for encrypting data and storing data securely.

2. Description of the Related Art

A password authentication process determines whether a password (PWD) is valid for a particular user account (UID). Ideally such process should be designed and built in such a way that no passwords can ever be recovered therefrom, even, for example, when the corresponding system is breached completely and all program code and data thereof are stolen. This implies, foremost, that the password authentication system must not contain stored passwords. Presently, it is impossible to make any such system completely secure; however, there are ways to make it secure enough that breaches are difficult and attacking the system becomes impractical.

For purposes of understanding herein, a cryptographically secure hash function, sometimes referred to herein in brief as "hash function," is a one-way function that maps any variable amount of input data into a fixed-size output value. For purposes of understanding herein, the output of the hash function applied to particular data is referred to as a digest of that data, or simply "digest." When the input data to the hash function changes even a little bit, the resulting digest is completely different from the digest produced by applying the hash function to the unchanged input data.

It should be appreciated that while the hash function is considered effectively irreversible, i.e. that it is not possible to compute the original data from only its digest, there are other known ways by which the original data can be recovered. Thus, applying a hash function to data therefore may be considered only a first level of defense.

When the data to be hashed form a PWD, it is sometimes likely that many UIDs use identical PWDs that would therefore have the same digest. Such users may then be easy to identify as targets where an attacker, by compromising any one user, may then exploit more or all of such users. One way to prevent the same PWDs resulting in the same digest is to append a random string, referred to herein as a salt, to each password, before applying a hashing function. Thus, appending a unique random string to each PWD makes the input to the hash function unique and thereby avoids generating duplicate digests.

Rather than hashing the concatenation of a message and a salt to produce a digest, instead a keyed hash function takes the message and the salt as separate arguments or inputs. These two embodiments are equivalent and interchangeable. They differ mainly in that the keyed hash function usually combines the message and the key, or salt, in a way that is more rigorous than simply appending one to the other.

Presently, the above-described methodology is used commonly in password authentication systems and methods regarding computer security. For example, when creating a user account, the user is asked to enter a UID and a PWD. The password authentication process, upon receiving the UID and PWD, generates a unique salt, appends the salt to the PWD, and applies the hash function to the salted PWD to generate a digest. Such password authentication process then may store the UID, the salt, and the digest without ever storing the PWD, which may be discarded. Subsequently, when the user attempts to login, e.g. to access the password protected system, the user enters his or her UID and PWD to the password authentication system. The password authentication system attempts to authenticate the login by using the UID to retrieve the corresponding salt and digest. The password authentication system next appends the retrieved salt to the entered PWD and applies the hash function to this salted PWD to produce a new digest. The password authentication system then compares the new digest to the retrieved digest. When the new digest and the retrieved digest match, the PWD is valid, otherwise not.

It has been found that when trying to breach a login password authentication system, an attacker typically may first steal at least a portion of the stored UIDs, salts, and digests. On his own computer, the attacker then attempts to authenticate possible PWDs until the attacker finds at least one salted PWD that hashes to a stolen digest, perhaps using various shortcuts that make this brute force process more efficient.

SUMMARY OF THE INVENTION

A blind hashing system and method are provided in which blind hashing is used for data encryption and secure data storage such as in password authentication, symmetric key encryption, revocable encryption keys, etc. The system and method include using a hash function output (digest) as an index or pointer into a huge block of random data, extracting a value from the indexed location within the random data block, using that value to salt the original password or message, and then hashing it to produce a second digest that is used to verify the password or message, encrypt or decrypt a document, and so on. A different hash function can be used at each stage in the process. The blind hashing algorithm typical runs on a dedicated server and only sees the digest and never sees the password, message, key, or the salt used to generate the digest.

DETAILED DESCRIPTION OF THE INVENTION

A blind hashing system and method are provided in which blind hashing is used for data encryption and secure data storage such as in password authentication, symmetric key encryption, revocable encryption keys, etc. The system and method include using a hash function output (digest) as an index or pointer into a huge block of random data, extracting a value from the indexed location within the random data block, using that value to salt the original password or message, and then hashing it to produce a second digest that is used to verify the password or message, encrypt or decrypt a document, and so on. A different hash function can be used at each stage in the process. The blind hashing algorithm typical runs on a dedicated server and only sees the digest and never sees the password, message, key, or the salt used to generate the digest.

Introduction

One or more embodiments herein, each referred to as "blind hashing," provide a novel system and method that combine high performance, scalability, and a level of security for but not limited to password authentication systems, encrypting messages and the like, which were unachievable until now. It should be appreciated that for purposes of simplicity in understanding, embodiments herein may be described referring to password authentication systems. However, such particular implementation is by way of example only and is not meant to be limiting as one skilled in the art would readily recognize that the fundamental concepts, structure, and functionality herein may be applied in other areas as well such as for example in encrypting messages.

In an embodiment, blind hashing makes possible a novel way to authenticate passwords or encrypt messages. Blind hashing starts with a pre-existing method that applies a cryptographically secure hash function, defined hereinabove, to a salted password and saves the resulting digest. Although widely used, this method is not at all secure, with passwords and the like often being stolen as a consequence. Blind hashing extends such prior art methods. Importantly, blind hashing extends using the cryptographically secure hash function to make such hash function use much more secure at little extra cost. For example, in an embodiment, blind hashing uses the hash function output as an index or pointer into a huge block of random data, extracts a value from the indexed location within the random data block, uses that value to salt the original password or message, and then hashes the original password or message a second time with the new salt.

It should be appreciated that one or more blind hashing components of embodiments herein, e.g. a password authentication system, never see the password that is being hashed and therefore cannot possibly divulge that password, even when such a system were wholly compromised by an attacker stealing the program code and all of the data. The other components of the embodiments, e.g. password authentication system, have no direct access to the blind hashing data block and therefore cannot validate passwords by themselves because they cannot perform the blind hashing stage.

Prior art password authentication systems may be somewhat secure, yet remain vulnerable as evidenced by how seemingly robust existing systems are hacked all the time. For example, an attacker who steals part of the database containing the UIDs, salts, and digests may try different PWDs repeatedly until he or she finds, for each UID, the particular PWD that works. Presently, the only known defense against such a brute force attack is making passwords long and complex, thus harder to guess, while making the hash function expensive in terms of the time and memory needed to run it, thus costly to execute a great many times while guessing.

Long and complex passwords, although harder to guess, are also correspondingly more difficult to remember. The extra cost to run an expensive hash function gets incurred during every legitimate login attempt.

The cost to recover a password may be defined as the password strength, i.e. the expected number of guesses needed to discover such password, times the cost in computational resources of each guess. Although a more secure password may be more costly to guess, the converse is emphatically false: high cost of hashing cannot protect a weak password from being discovered. In sharp contrast thereto, blind hashing protects even weak passwords and it does so with no significant increase in cost.

It should be appreciated in an embodiment, that the greater security and lower cost of blind hashing results from a combination of two innovations: an enhancement to prior art hashing processes typically used to encipher passwords and the use, at one stage of this process, of a very large data block containing arbitrary or random data as described in further detail hereinbelow.

Terminology and Some Assumptions

In accordance with one or more embodiments and for purposes of understanding herein, both a salt and a digest may be considered as 64-byte positive integers. Each may be other sizes in practice and may not be the same size as each other; however, 64 bytes may be commonly used for both.

A hash function may be any of several existing cryptographically secure hash functions or a custom built function. As well, in an embodiment, a different hash function may be used at each stage in the blind hashing process.

Every digest produced by a particular hash function has the same length. The length of a salt may vary, although it should be appreciated that it is easier to describe herein when a constant length equal to the digest length is assumed.

A salt is typically generated using a random-number generator. One exception to such assumption is the point in the blind hashing algorithm where a digest is subsequently used to produce a salt. It should be appreciated that a salt may serve the same structure and functionality as a key, although such terms may be used in different contexts.

Exemplary Embodiments

Overview

Figure 1:
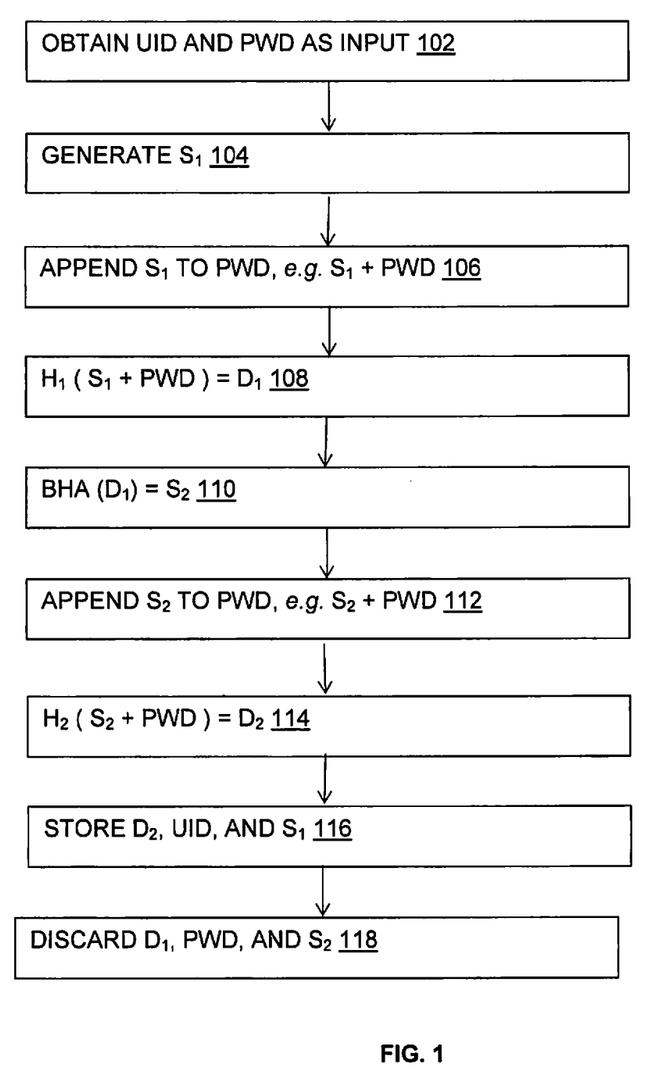
FIG. 1 is a process flow diagram showing a process when a user creates a user account, according to an embodiment.
Figure 2:
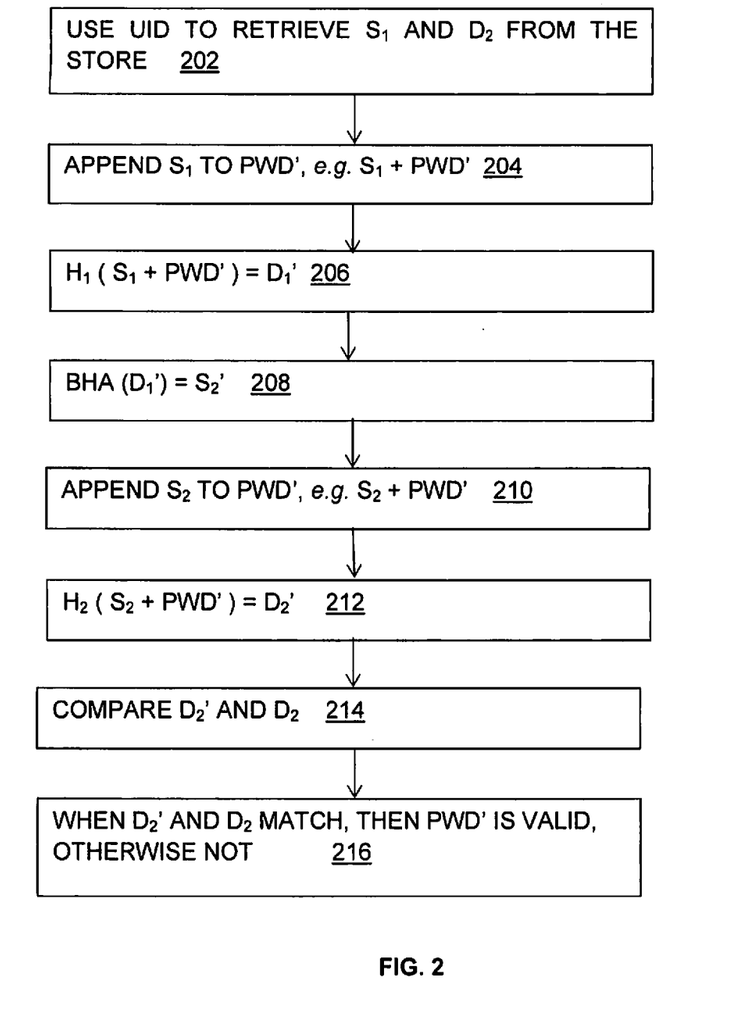
FIG. 2 is a process flow diagram showing how to use blind hashing to authenticate a login attempt, according to an embodiment.

A high level description of an embodiment of blind hashing can be understood with reference to FIG. 1 and FIG. 2. FIG. 1 is a process flow diagram showing a process when a user creates a user account, according to an embodiment. When using blind hashing to create a user account, such system or application requests a UID and a PWD from the user as input (102). Next, generate a first salt ($S_1$) (104), append $S_1$ to the PWD (106), and apply a first hash function to produce from the salted PWD a first digest ($D_1$) (108), as described earlier when using prior art methods. Next, apply a blind hashing algorithm described in further detail hereinbelow, to $D_1$ to generate a second salt ($S_2$) (110). Then, append the second salt to the original PWD (112) and then apply a second hash function, which may the same or different as the first hash function, to produce a second digest ($D_2$) (114). In an embodiment, store $D_2$, UID, and $S_1$ (116). The PWD, first digest, and second salt may be discarded (118).

In an embodiment, using blind hashing to authenticate account UID with password PWD' can be understood with reference to FIG. 2. That is, when using blind hashing to authenticate a login attempt, supply the UID to retrieve the corresponding first salt and second digest (202). Then append the first salt to the supplied password, PWD', (204) and apply the first hash function to produce from this salted PWD' a first digest, ($D_1'$) (206), as described earlier using prior art. Next, apply the blind hashing algorithm to such first digest to generate a second salt $S_2'$ (208.) Next, append such second salt to the provided PWD' (210). Then, apply the second hash function to produce a second digest ($D_2'$) (212). Lastly, compare that second digest to the retrieved second digest. If they match, the PWD' is valid, otherwise not (216).

Blind Hashing Algorithm

In an embodiment, the blind hashing algorithm (BHA) transforms a digest into a new salt by using a huge block of arbitrary data as a lookup table. In an embodiment, BHA applies or uses the digest as an index, or offset, into a block of random data and returns data found in such block. It should be appreciated that the size of the digest and the data block may be determined based on design for optimizing efficiency, security, and other variables.

As a simple example, when the digest is only one byte, the data block may be 256 bytes, and the digest may be used directly as an index into the data block.

In another, more realistic embodiment, given a 64-byte digest, the data block may be 100 terabytes or larger. Further, in accordance with this embodiment, the 64-byte digest may be an unsigned integer that is divided by the data block length and the remainder may be used as an index into the data block to retrieve successive bytes beginning at that location.

In an embodiment, such arbitrary data block is embodied as a seeded pseudorandom number sequence, in which case such arbitrary data block may be recreated from the seed.

In another embodiment, such arbitrary data block may be embodied as an unseeded pseudorandom number sequence, in which case such arbitrary data block must be backed up in its entirety.

It should be appreciated that neither the BHA by itself nor the rest of the password authentication process can be attacked to discover any passwords. The BHA, typically running on a blind hashing server, sees only the digest and never sees the PWD nor the salt used to generate the digest. The login process, typically running elsewhere on a password authentication server, stores the first salt and the second digest, but not the first digest nor the second salt. The two stored values, i.e. the first salt and the second digest, are completely unrelated to one another. Moreover, each stored value is useless without its companion value, i.e. the first digest and the second salt, respectively. Only when both servers are both compromised could any passwords be recovered and the blind hashing server has special characteristics that protect it against attacks. As well, the sheer size of the data block used by the BHA server protects it against attacks.

In a preferred embodiment, the BHA can service a great many different password authentication system clients, while only maintaining a single huge data block. This raises two issues. Information that a client gains by calling the blind hashing server must not be useful for attacking another client. Also, the result that a client obtains from calling the blind hashing server must be unique to that client, thereby preventing one client from authenticating another client's data. To provide these guarantees, the BHA performs two steps, one before the data block lookup and one afterward, which can be understood with reference to FIG. 3. Before such data block lookup, e.g. after step 108 or 206, BHA appends to its first digest input ($D_1$ or $D_1'$) a salt associated with the client ($S_{CLIENT}$) who invoked it, referred to as a client salt (308). BHA then applies a hash function to produce from this salted first digest a new digest ($D_1''$) and uses $D_1''$ as an index into the data block to retrieve a new salt, $S_3$ (312).

Figure 3:
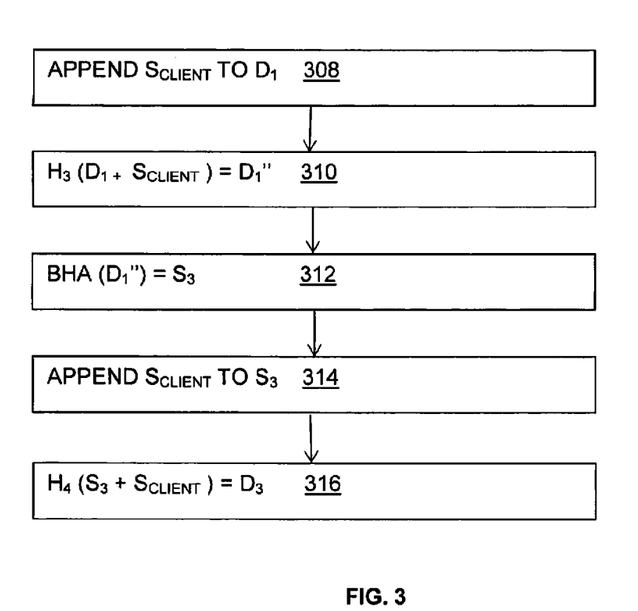
FIG. 3 is a partial process flow diagram showing how the blind hashing algorithm provides two steps, one before the data block lookup and one afterward, that can identify and isolate multiple clients thereby protecting each from the others, according to an embodiment.

The algorithm then appends to its second-salt output ($S_3$) from the data block the client salt ($S_{CLIENT}$) or a different client salt and then applies a hash function to produce from this salted second-salt a new digest ($D_3$) that the algorithm takes as the new second-salt output (316).

Such embodiment protects the blind hashing data block from discovery, which could occur, for example, if a client saved inputs and outputs over many blind hashing requests or if an attacker made probing requests to the data block and siphoned off the results. Such embodiment also ensures that the data are unique to each client, because the digests and salts are dependent on client data, thereby preventing identical passwords for two different clients from having the same digest. Such embodiment also prevents one client from performing blind hashing on another client's data.

To further protect the data block from an attacker, a preferred embodiment of blind hashing performs multiple iterations of a data block lookup, using the data retrieved from each iteration to derive the index for the next iteration. Or, alternatively, it retrieves data from a sequence of indices and then combines the retrieved data with a hashing function. Such practices increase exponentially the amount of the data block which must be stolen before it is useful to an attacker. For example, if only a single lookup were used, and if 75% of the data block were stolen, then 75% of the indexes would point to data that are available to the attacker and the lookup succeeds 75% of the time. If instead eight lookups were performed, while each lookup still has a 75% chance of success, obtaining the correct result requires all eight lookups, a success rate of $(0.75)^8$ or only about 10%. If 256 lookups are used, and 98% of the data block is stolen, the attacker would still have only a 0.5% chance of being able to generate a salt for any given digest. Performing multiple lookups effectively amplifies the impact of any missing data in the block to the point where it is useless to have less than the entire data block.

An Exemplary Blind Hashing Data Block

Figure 4:
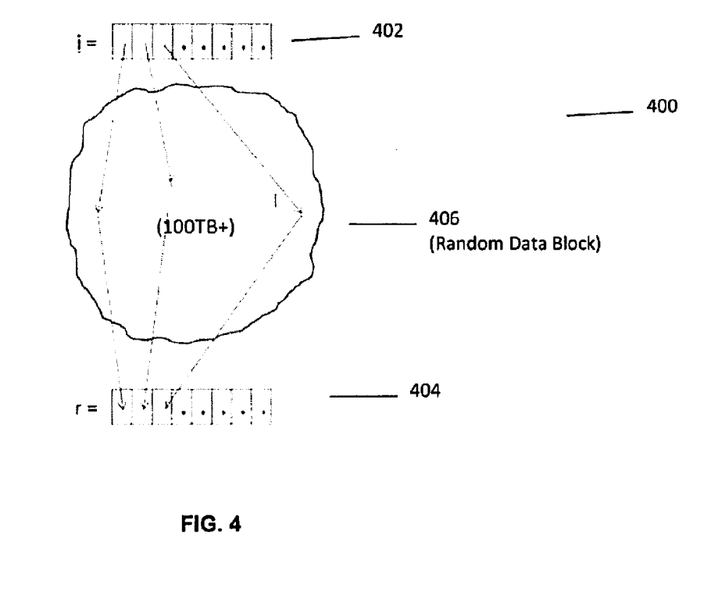
FIG. 4 is a schematic diagram showing how blind hashing uses a huge block of random data, according to an embodiment.

An exemplary blind hashing data pool construction can be understood with reference to FIG. 4. It should be appreciated that such embodiment and accompanying diagram are by way of example and are not meant to be limiting. One skilled in the art could readily construct other uniformly random distributed data blocks using the fundamental principles set forth herein.

In the embodiment, The 'i' in the diagram to the left represents an indexer value 402 and the r represents a pseudorandom value 404 being pulled out of a data block 406. It should be appreciated that such embodiment achieves or preserves two properties, in no particular order:

different values produce uniformly random distributed data; and

'r' values may be uncorrelated and yet a single 'i' will always return the same 'r'.

That is to say, such function is deterministic.

In an embodiment, 'i' 402 may be split into 64-bit values to be used as indices. It has been found that splitting up i 402 may be one way to meet the two properties depicted above.

In an embodiment, 'i' value 402 need not be directly entered by the client, e.g. a client site or application, but rather extrapolated from client input in a similarly deterministic fashion. For example, the blind hashing mechanism may hash input from the client. Such may be done to ensure that clients do not have complete control over what value 'i' takes. For example, in an embodiment, 'i' may be $D_2$.

Retrieving a Salt from the Blind Hashing Data Block

An embodiment for retrieving a salt from blind hashing data block 406 is described with particular details hereinbelow. However, one skilled in the art would readily recognize that such details may be illustrative only and are not meant to be limiting.

In an embodiment, the blind hashing algorithm takes as input a first digest [$D_1$ (110) or $D_1'$ (208)] which may be a 512-bit (64-byte) number, and uses this first digest value as an index into the data block, referred to herein as the indexer (402).

In a preferred embodiment, BHA appends to its first digest input a salt associated with the client ($S_{CLIENT}$) who invoked it, referred to as a client salt (308). BHA then applies a hash function to produce from this salted first digest a new digest ($D_1''$) and uses $D_1''$ as an index into the data block, referred to herein as the indexer (402).

In embodiments, assuming it is desired that the salt to be returned, e.g. $S_2$, is a 64-byte number, an embodiment may split the 512-bit number, e.g. i 402, into eight 64-bit addresses. Each 64-bit address may then be used as an index into the array, e.g. random data block 406, to retrieve 8 bytes of data, e.g. r 404, from that index onwards. The eight 8-byte values, r 404, retrieved from random data block 406 are combined to form a 64-byte value which is returned to the user or client.

It further should be appreciated that fundamentally the properties of the computation may include but are not limited to the following in no particular order:
- When a same input is given multiple times, the same output is returned each time;
- For two different inputs, the outputs are completely uncorrelated;
- Impossible for client to discover the underlying bytes that the data block is composed of; and
- Impossible for one client to use their results from the blind hashing algorithm to attack another client.

It should be appreciated that both the $S_{CLIENT}$ and $D_1$ may be instrumental in determining the salt value that is retrieved. In one embodiment, such requirement may not be required. However, it has been found that such property may be particularly useful. For example, different $S_{CLIENT}$ result in different responses, e.g. $S_2$'s for the same $D_1$. Such property may be important and it may prevent one client from attacking another client. For example, if client A, for whatever reason, knows the $D_1$ of client B, such knowledge still does not enable client A to obtain the same response as would client B. As well, having the $S_{CLIENT}$ may make it easier to rate limit potential attackers based on the $S_{CLIENT}$. As well, even blacklisting a specific $S_{CLIENT}$ may be used to prevent attempts of others to retrieve a salt using that $S_{CLIENT}$, which may be referred to as revocable encryption, discussed in further detail hereinbelow. Thus, effectively each user is given their own playground where anything they do will not impact another user.

An Exemplary Embodiment for Symmetric Key Encryption

In accordance with one or more embodiments, blind hashing may be used for other purposes besides password authentication such as but not limited to symmetric key encryption. Presently, when encoding a message using symmetric key encryption, often a password is hashed and its digest is used as the encryption key. Then, the key is used to encrypt the message and is thereafter discarded. That message may now be decrypted only by someone or some entity who knows the password and can hash that password to recreate the key.

Thus, if the encrypted message is stolen, a determined attacker can still decrypt it by trying every possible password, as before, until the attacker finds the right password. For example, an attacker might start with a list of the 100 billion most likely passwords. For each password in the list, the attacker hashes the password, decrypts the message using the resulting digest as the key, and checks for telltale signs that the decryption was successful. Blind hashing prevents this kind of brute force attack.

In an embodiment, when using blind hashing to encrypt a message, the embodiment includes generating a first salt, appending the first salt to the password, and applying the hash function to produce from that salted password a first digest, such as for example, as described earlier while creating a user account in steps 104, 106, and 108. Next, and as also depicted in FIG. 1, the embodiment includes applying the blind hashing algorithm to produce from that first digest a second salt such as for example as shown in step 110. Lastly, the embodiment includes appending the second salt to the original password such as for example in step 114 and then applying the hash function once again or a different hash function to produce a second digest, such as for example also as shown in step 114, that may be used as the encryption key. Finally, the embodiment includes combining the first salt with the encrypted message such as for example but not limited to placing the first salt at the beginning of the encrypted message. The embodiment then includes discarding both digests and the second salt.

In an embodiment, when using blind hashing to decrypt a message that has been encrypted as described above, the embodiment strips off the first salt that was combined with, e.g. placed at the beginning of, the encrypted message. Then the stripped off first salt is appended to the password such as for example as shown in FIG. 2 at step 204. The hash function is applied to produce from this salted PWD a first digest for example as shown at step 206. Next, the blind hashing algorithm is applied to produce from that first digest a second salt as shown for example at step 208. Lastly, that second salt is appended to the provided password for example as shown at step 210, the hash function or the different hash function is applied to the second-salted PWD to produce a second digest as shown for example at step 212. Finally such second digest is used as the decryption key.

An Exemplary Embodiment for Revocable Encryption Key

One embodiment of secure encryption with blind hashing is a revocable encryption key that allows the encoded message to be decrypted only up until such time as someone chooses to make it thereafter indecipherable. For example, when the confidential documents in an embassy are encrypted using blind hashing, simply revoking the keys during an attack on the embassy can make or render the documents that use those keys substantially impossible to decode. Thus, it should be appreciated that therefore the encrypted documents themselves need not be destroyed.

In an embodiment, revoking a set of keys may include simply instructing the blind hashing system or method to disable the set of salts uniquely associated with the client who created those keys or associated with the client ID that was used to create the set of salts.

One embodiment revokes a set of keys by blacklisting the client salt that was used by the blind hashing process when the keys were created. Thus, when such client salt is later re-enabled—perhaps after the embassy attack has been thwarted—the documents encrypted by those keys can once again be decoded. It should be appreciated that this embodiment may not be fully secure because an attacker who steals the entire blind hashing server could themselves re-enable the client salt.

Another embodiment replaces each client salt with a corresponding secret salt during the blind hashing process and may revoke a set of keys by destroying the secret salt used when the keys were created. This approach is secure; however, it should be appreciated that it will be forever impossible to decode the documents that were encrypted using that key, even when the correct password is known.

Some Advantageous Features

An overview of some fundamental novel features of blind hashing, includes but is not limited to the following, in no particular order.

High Performance: The cost to execute the BHA may be very low, thus it is consequently highly scalable;

Additional Layer of Security: Even when the password database, e.g. of a login service, is stolen, the stored salts and digests may not be useful without also stealing the entire huge data block;

No Displaced Trust: For purposes of understanding herein, no displaced trust means it may be impossible for the enterprise providing the blind hashing mechanism to grant itself access to the system of a customer utilizing the blind hashing mechanism;

Conferred Impregnability: Because a successful attack must compromise both the password authentication system client and the blind hashing server, one robust server can shelter many vulnerable clients from attack;

No Downside: It should be appreciated that even when an entity hacks the blind hashing mechanism and is able to steal the data store thereof, such entity could not use such data store to then access a system of a client via such blind hashing mechanism without also requiring that the client's password database be also compromised;

Cloud Based/Economy of Scale: The blind hashing mechanism may provide the service via the cloud, to multiple clients, using a single shared data block. The cost, and commensurate security, of maintaining a huge data block can be shared across multiple parties.

No End User Intervention: Embodiments herein generate user passwords that are stronger, yet without getting in the user's way;

Totally invisible to the end-user, however extremely powerful to the backend protection.

Obfuscating the Data Store

It should be appreciated that particular details described hereinbelow are illustrative only and are not meant to be limiting. Other components or steps may be used which embody the concept of obfuscating the data store but are not necessarily depicted in the description hereinbelow.

Because a large number, e.g. of blind hashing algorithm requests may occur over time, it may be possible for an attacker to siphon off data from the data block using such algorithm. Thus, it may be desirable to make it difficult for such attacker to be able to do so. Siphoning data is the process of retrieving salt values and then organizing such salt values on the attacker's hard drive to try to recreate a shadow copy of the data store.

Cost Deterrent

One embodiment charges the end user based on a particular number of requests made using a given UID. Such approach makes it economically unattractive to try to siphon data in this fashion. For example, given a 100 TB data block, a system would need to make 312 billion requests, each returning 32-bytes, to siphon off 10% of the data block. Assuming a charge of $0.01/user and allowing 1000 logins/year for each user, such parameters may in effect be a charge of $1 per 100,000 requests. In this case the attacker has to spend $3,125,000 to run 312 billion requests.

Entirely Prevent Siphoning using HMAC

It has been found that to siphon data the attacker is required to know indexer, i 402, and 'r' value 404, which is retrieved from random data block 406. According to embodiments herein, the attacker's ability to even see 'r' has been eliminated by adding another hash function computation 316.

Apply a hash function to r and $S_{CLIENT}$ and return the resulting value as the salt;

When 'r' 404 is uniformly randomly distributed and uncorrelated with the indexer, i 402, then H ($S_{CLIENT}$, r) also shares such two properties; and An attacker would then only know $S_{CLIENT}$ and the salt from the equation H ($S_{CLIENT}$, r)=salt and recovering r in this case, where r is a random 64-byte value, should be computationally impossible for several decades.

Client Access Control

In an embodiment, each client has their own 64-byte client salt or ID which the blind hashing mechanism randomly generates. This value may be sent to the blind hashing mechanism over a secure channel at the start of each session to authenticate the client with the blind hashing mechanism.

In an embodiment, the blind hashing mechanism may allow clients to configure access rules based on their client IDs. Examples of configured access rules are provided as follows. It should be readily apparent to one skilled in the art that such list is by way of example only and is not meant to be limiting. One skilled in the art could readily provide other configurations of rules not listed however are within scope of the concepts described herein about blind hashing:

IP whitelist
   A list of IP addresses which are allowed to run Salt requests on that ID
Geographic whitelist
   A list of locations determined by GeoIP lookup, which are allowed to run Salt requests on that ID
Time-based access control
   Only allow Salt requests at certain dates or times or after a certain date and/or time
Multi-factor access control
   Only allow Salt requests on that ID when a second factor such as a OTP is provided
Event based access control
   Only allow Salt requests on that ID after a specific event, such as for example "the next time the Red Sox win the World Series" or "2 weeks after person X dies"
Multi-Party access control
   Only allow Salt requests when multiple different parties are connected concurrently.

It should be appreciated that whatever access control embodiments are implemented and because retrieving the salt is an important aspect in performing a password lookup or decryption operation, preventing a blind hashing algorithm operation may effectively prevent the user login or decryption from succeeding until the access control requirement is met.

An Example Machine Overview

Figure 5:
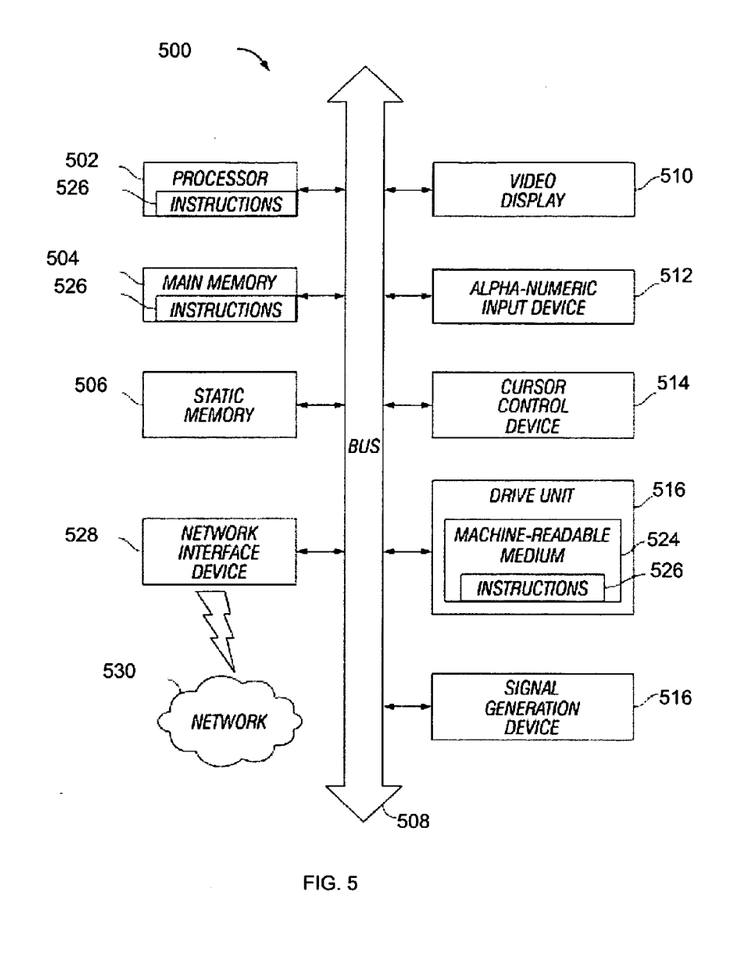
FIG. 5 is a block schematic diagram of a system in the exemplary form of a computer system according to an embodiment.

FIG. 5 is a block schematic diagram of a system in the exemplary form of a computer system 500 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 500 includes a processor 502, a main memory 504 and a static memory 506, which communicate with each other via a bus 508. The computer system 500 may further include a display unit 510, for example, a liquid crystal display (LCD) or a cathode ray tube (CRT). The computer system 500 also includes an alphanumeric input device 512, for example, a keyboard; a cursor control device 514, for example, a mouse; a disk drive unit 516, a signal generation device 518, for example, a speaker, and a network interface device 528.

The disk drive unit 516 includes a machine-readable medium 524 on which is stored a set of executable instructions, i.e. software, 526 embodying any one, or all, of the methodologies described herein below. The software 526 is also shown to reside, completely or at least partially, within the main memory 504 and/or within the processor 502. The software 526 may further be transmitted or received over a network 530 by means of a network interface device 528.

In contrast to the system 500 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable enterprises to provide blind hashing mechanisms on such internet-enabled or other network-enabled devices, servers, or clients. It further should be appreciated that one or more cloud computing embodiments may include aspects of blind hashing using mobile devices, tablets, and the like, as such devices are becoming standard consumer as well as computing devices.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for blind hashing in password authentication, comprising:
    obtaining a user id and a password as input;
    generating a first salt;
    combining the first salt to the password to create a first salted password;
    applying a hash function to the first salted password to create a first digest;
    using the first digest as an index into a random data block to retrieve from the random data block a second salt;
    combining the second salt to the password to create a second salted password;
    applying a hash function to the second salted password to create a second digest;
    storing the second digest, the user id, and the first salt in a storage;
    discarding the first digest, the password, and the second salt;
    to authenticate a received input password, using the user id to retrieve the first salt and the second digest from the storage;
    combining the first salt to the password to be authenticated;
    applying the hashing function to the first salted password to be authenticated to create another first digest;
    using said another first digest as an index into the random data block to retrieve from the random data block another second salt;
    combining said another second salt to the password to be authenticated to create another second salted password;
    applying the hash function to said another second salted password to create another second digest;
    comparing said another second digest with said retrieved second digest;
    and when said another second digest matches said retrieved second digest, determining the password to be authenticated is authenticated and otherwise not;
    wherein one or more steps are performed on at least a processor coupled to at least a memory.

2. The method of claim 1, wherein the random data block is at least 100 terabytes, each digest is 64-bytes and an unsigned integer that is divided by the random data block length, and the remainder is used as the index into the random data block to retrieve successive bytes beginning at that location.

3. The method of claim 1, wherein the random data block is derived from a seeded pseudorandom number sequence and can be recreated from the seed.

4. The method of claim 1, wherein the random data block is an unseeded pseudorandom number sequence and the random data block is backed up in its entirety for recreating the random data block.

5. The method of claim 1, wherein a blind hashing algorithm runs on a blind hashing server, sees only the digest and never sees the password nor the salt used to generate the digest, and then returns the second salt to the login process which runs elsewhere on a password authentication server and stores the first salt and the second digest, but not the first digest nor the second salt.

6. The method of claim 1, wherein the blind hashing algorithm performs multiple iterations of lookups into the random data block, using the data retrieved from each iteration to derive the index for the next iteration.

7. The method of claim 1, wherein the blind hashing algorithm retrieves data from a sequence of indices and then combines the retrieved data with a hashing function.

8. The method of claim 1, wherein the blind hashing algorithm preserves two properties, in no particular order: different index values produce uniformly random distributed data; and returned values, 'r', are uncorrelated, yet a single index always returns the same 'r'.

9. The method of claim 1, wherein the index is split into 64-bit values and each of the 64-bit values are used as indices to the random data block.

10. The method of claim 1, wherein the index value is not directly entered by a client site, device, or application, but is extrapolated from input of said client site, device, or application in a deterministic fashion.

11. The method of claim 9, wherein the blind hashing algorithm hashes said client input to ensure that said client does not have complete control over what value the index takes.

12. The method of claim 1, wherein the second salt is a 64-byte number and wherein the index is a 512-bit number that is split into eight 64-bit addresses, each 64-bit address is used as an index into the random data block to retrieve 8 bytes of data, and the eight 8-byte values are combined to form a 64-byte value which is returned to the user or client.

13. The method of claim 1, wherein each client has their own 64-byte client salt or ID and each of which are randomly generated by the blind hashing algorithm.

14. The method of claim 1, wherein said 64-byte client salt or ID is sent to the BHA a blind hashing server over a secure channel in order to verify a password to authenticate the client.

15. A computer implemented method for blind hashing in symmetric key encryption, comprising: generating a first salt;
  combining the first salt to a password to create a salted password;
  applying a hash function to the salted password to generate a first digest;
  using the first digest as an index into a random data block to retrieve from the random data block a second salt;
  combining the second salt to the password to create a second salted password; applying a hash function to the second salted password to generate a second digest;
  using the second digest as an encryption key with which to use to encrypt a message;
  storing the first salt and the encrypted message and discarding both digests and the second salt;
  for subsequently decrypting the message, obtaining the first salt and the encrypted message;
  combining the first salt to the password to create a salted password;
  applying the hash function to the salted password to produce another first digest;
  using said another first digest as an index into the random data block to retrieve from the random data block another second salt;
  combining said another second salt to the password to create another second salted password;
  applying the hash function to said another second salted password to generate another second digest;
  and using said another second digest as a decryption key with which to decrypt said encrypted message;
  wherein one or more steps are performed on at least a processor coupled to at least a memory.

16. The method of claim 14, wherein one or more keys are revoked by disabling the set of salts associated with the client who created those keys or the set of salts associated with the client ID that was used to create the set of salts.

17. The method of claim 14, wherein one or more keys are revoked by blacklisting the client salt that was used when the keys were created.

18. The method of claim 14, wherein the one or more client salts are re-enabled.

19. The method of claim 14, wherein each client salt is replaced by a corresponding secret salt and wherein revocation of the corresponding set of keys is performed by destroying the secret salt used when the keys were created.

20. A system for blind hashing in password authentication, comprising:
  At least one processor;
  and memory coupled to said processor to carry out the steps of: obtaining a user id and a password as input; generating a first salt;
  combining the first salt to the password to create a first salted password;
  applying a hash function to the first salted password to create a first digest;
  using the first digest as an index into a random data block to retrieve from the random data block a second salt;
  combining the second salt to the password to create a second salted password;
  applying a hash function to the second salted password to create a second digest;
  storing the second digest, the user id, and the first salt in a storage;
  discarding the first digest, the password, and the second salt;
  to authenticate a received input password, using the user id to retrieve the first salt and the second digest from the storage;
  combining the first salt to the password to be authenticated;
  applying the hashing function to the first salted password to be authenticated to create another first digest; using said another first digest as an index into the random data block to retrieve from the random data block another second salt;
  combining said another second salt to the password to be authenticated to create another second salted password;
  applying the hash function to said another second salted password to create another second digest;
  comparing said another second digest with said retrieved second digest;
  and when said another second digest matches said retrieved second digest, determining the password to be authenticated is authenticated and otherwise not.

21. A system for blind hashing in symmetric key encryption, comprising:
  at least one processor; and memory coupled to said processor to carry out the steps of:
  generating a first salt;
  combining the first salt to a password to create a salted password;
  applying a hash function to the salted password to generate a first digest;
  using the first digest as an index into a random data block to retrieve from the random data block a second salt;
  combining the second salt to the password to create a second salted password;
  applying a hash function to the second salted password to generate a second digest;

using the second digest as an encryption key with which to use to encrypt a message;

storing the first salt and the encrypted message and discarding both digests and the second salt;

for subsequently decrypting the message, obtaining the first salt and the encrypted message;

combining the first salt to the password to create a salted password;

applying the hash function to the salted password to produce another first digest;

using said another first digest as an index into the random data block to retrieve from the random data block another second salt;

combining said another second salt to the password to create another second salted password;

applying the hash function to said another second salted password to generate another second digest;

and using said another second digest as a decryption key with which to decrypt said encrypted message.

22. A non-transitory storage medium having stored thereon a computer program comprising a program code to perform a method for blind hashing in password authentication when the computer program is executed on a computer, the method comprising:

obtaining a user id and a password as input;

generating a first salt;

combining the first salt to the password to create a first salted password;

applying a hash function to the first salted password to create a first digest;

using the first digest as an index into a random data block to retrieve from the random data block a second salt;

combining the second salt to the password to create a second salted password;

applying a hash function to the second salted password to create a second digest;

storing the second digest, the user id, and the first salt in a storage; discarding the first digest, the password, and the second salt;

to authenticate a received input password, using the user id to retrieve the first salt and the second digest from the storage;

combining the first salt to the password to be authenticated;

applying the hashing function to the first salted password to be authenticated to create another first digest;

hashing said another first digest as an index into the random data block to retrieve from the random data block another second salt;

combining said another second salt to the password to be authenticated to create another second salted password;

applying the hash function to said another second salted password to create another second digest;

comparing said another second digest with said retrieved second digest;

and when said another second digest matches said retrieved second digest, determining the password to be authenticated is authenticated and otherwise not.

23. A non-transitory storage medium having stored thereon a computer program comprising a program code to perform a method for blind hashing in symmetric key encryption when the computer program is executed on a computer, the method comprising:

generating a first salt;

combining the first salt to a password to create a salted password;

applying a hash function to the salted password to generate a first digest;

using the first digest as an index into a random data block to retrieve from the random data block a second salt;

combining the second salt to the password to create a second salted password;

applying a hash function to the second salted password to generate a second digest;

using the second digest as an encryption key with which to use to encrypt a message;

storing the first salt and the encrypted message and discarding both digests and the second salt;

for subsequently decrypting the message, obtaining the first salt and the encrypted message;

combining the first salt to the password to create a salted password;

applying the hash function to the salted password to produce another first digest;

using said another first digest as an index into the random data block to retrieve from the random data block another second salt;

combining said another second salt to the password to create another second salted password;

applying the hash function to said another second salted password to generate another second digest;

and using said another second digest as a decryption key with which to decrypt said encrypted message.

* * * * *